United States Patent
Matsuda et al.

(10) Patent No.: US 6,407,184 B1
(45) Date of Patent: Jun. 18, 2002

(54) METHOD OF MULTISTAGE GAS PHASE POLYMERIZATION, APPARATUS THEREFOR AND DEVICE FOR REDUCING ENTRAINMENT OF SUBCOMPONENTS IN POLYMER POWDER IN APPARATUS FOR MULTISTAGE GAS PHASE POLYMERIZATION

(75) Inventors: Shotaro Matsuda, Kuga-gun; Satoru Ohtani, Ichihara; Yoshiaki Kikuchi, Ichihara; Toshihiro Okano, Ichihara, all of (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/539,785

(22) Filed: Mar. 31, 2000

(30) Foreign Application Priority Data

Mar. 31, 1999 (JP) ............................ 11-092668

(51) Int. Cl.$^7$ ................................ C08F 2/34
(52) U.S. Cl. ............... 526/65; 526/68; 526/88; 526/348.2; 526/348.5; 526/348.6; 526/201
(58) Field of Search ............ 526/65, 68, 348.2, 526/348.5, 348.6, 88, 201, 901

(56) References Cited

U.S. PATENT DOCUMENTS

| | | |
|---|---|---|
| 4,420,592 A | 12/1983 | Kato et al. |
| 4,703,094 A | 10/1987 | Raufast |
| 4,902,483 A * | 2/1990 | Raufast ............ 422/134 |

FOREIGN PATENT DOCUMENTS

| | | |
|---|---|---|
| EP | 0529978 A1 | 3/1993 |
| JP | 57176305 | 10/1982 |
| JP | 58052309 | 3/1983 |
| JP | 11152303 | 6/1999 |

* cited by examiner

Primary Examiner—David W. Wu
Assistant Examiner—William K Cheung
(74) Attorney, Agent, or Firm—Birch, Stewart, Kolasch & Birch, LLP

(57) ABSTRACT

A method of multistage gas phase polymerization is provided comprising performing polymerization of a feed gas mixture at least containing ethylene gas, an α-olefin gas and hydrogen gas in an upstream fluid bed reactor to thereby produce a polymer powder, recovering the thus-produced polymer powder and performing further polymerization of the polymer powder in a downstream fluid bed reactor, the downstream fluid bed reactor being continuously connected to the upstream fluid bed reactor so that the polymer powder recovered from the upstream fluid bed reactor is introduced into the downstream fluid bed reactor, which method comprises the steps of: recovering polymer powder from the upstream fluid bed reactor, treating the recovered polymer powder so as to lower the content of α-olefin gas and hydrogen gas therein by contacting the polymer powder with a stream of gas comprising ethylene or an inert gas, and introducing the treated polymer powder into the downstream fluid bed reactor. By this method, α-olefin gas and hydrogen gas which inhibit the polymerization reaction in the downstream fluid bed reactor and which render regulation of desired polymer product properties difficult are removed from the polymer product prior to the downstream fluid bed reactor.

3 Claims, 3 Drawing Sheets

US 6,407,184 B1

METHOD OF MULTISTAGE GAS PHASE POLYMERIZATION, APPARATUS THEREFOR AND DEVICE FOR REDUCING ENTRAINMENT OF SUBCOMPONENTS IN POLYMER POWDER IN APPARATUS FOR MULTISTAGE GAS PHASE POLYMERIZATION

FIELD OF THE INVENTION

The present invention relates to a method of multistage gas phase polymerization using at least two fluid bed reactors in series, wherein the amount of subcomponents mixed in the polymer powder is reduced when polymer powder produced in an upstream arranged fluid bed reactor is taken up and introduced into a downstream arranged fluid bed reactor.

Furthermore, the present invention relates to a device for reducing the entrainment of subcomponents in the polymer powder as required in the implementation of the above method and relates to an apparatus of multistage gas phase polymerization including this device.

BACKGROUND OF THE INVENTION

In the production of, for example, an ethylene/α-olefin copolymer, it is common practice to employ a gas phase polymerization method in which a gas phase polymerization of a mixture comprising ethylene and an α-olefin is carried out in a fluid bed reactor in the presence of a titanium based solid catalyst.

In the above polymer production, the use of a single fluid bed reactor results in the formation of a polymer whose properties necessarily fall in certain limited ranges. However, products of complex properties are increasingly desired in accordance with the diversification of market demands. Therefore, polymers of the same species but with varied properties, namely differing in molecular weight, purity and physical properties, have been produced by the employment of the method of preparing polymers with varied properties with the use of a plurality of fluid bed reactors connected to each other.

With respect to this method, a method of multistage gas phase polymerization, for example, a method using a two-stage gas phase polymerization apparatus comprising first fluid bed reactor 111, and continuously connected thereto, second fluid bed reactor 121 as shown in FIG. 3 is now widely employed.

Specifically, solid catalyst A is fed through supply line 115 into first fluid bed reactor 111. Simultaneously, a feed gas mixture consisting of, for example, ethylene and an α-olefin is fed through supply line 112 into the first fluid bed reactor 111 at its bottom with the use of blower 113.

Hydrogen gas as a reaction inhibitor is premixed with the feed gas mixture in order to suppress the excess advance of the polymerization reaction. The molecular weight of the polymer produced by the first fluid bed reactor 111 as the first-stage polymerizer can be limited by appropriately terminating the polymerization reaction by the premixed hydrogen gas.

The fed gaseous olefin is passed through dispersion grid 117 containing, for example, a porous plate, which is arranged in the vicinity of the bottom of the first fluid bed reactor 111, and forms fluid bed 118 and maintains the fluid bed 118 in fluid form. Polymerization reaction is carried out in the fluid bed 118.

The thus produced polymer powder (particles) is continuously taken up, delivered into carrying line 125 by means of rotary valve 135 provided on take-up line 130, and fed through the carrying line 125 into second fluid bed reactor 121.

Unreacted feed gas having passed through the fluid bed 118 has its flow rate reduced in slowdown zone 119 provided in an upper part of the first fluid bed reactor 111 and discharged outside the first fluid bed reactor 111 through a gas outlet provided at the top of the first fluid bed reactor 111.

The unreacted feed gas having been discharged from the first fluid bed reactor 111 is passed through circulating line 116, is cooled by means of heat exchanger (cooler) 114 and joins the supply line 112. Thus, once more, the unreacted feed gas is continuously fed into the fluid bed 118 formed in the first fluid bed reactor 111 with the use of the blower 113.

On the other hand, the polymer powder taken up through the take-up line 130 from the first fluid bed reactor 111 is fed through the carrying line 125 into the second fluid bed reactor 121. Simultaneously, different feed gas mixture from that of the first reactor 111 is supplied through supply line 122 and through the carrying line 125 into the second fluid bed reactor 121 with the use of blower 123. Thus, fluid bed 128 is formed by the polymer powder, olefin gas and solid catalyst contained in the polymer powder in the second fluid bed reactor 121, and polymerization reaction is carried out in the fluid bed 128. Copolymer produced by the second fluid bed reactor 121 is continuously taken up through line 126.

The carrying line 125 is branched from the supply line 122, and a remote end of the carrying line 125 is connected to an upper part of the second fluid bed reactor 121. The olefin containing gas fed from the supply line 122 has its pressure increased by pressure increasing means such as centrifugal blower 141 and entrains the polymer powder taken up from the first fluid bed reactor 111 so that the polymer powder is carried and introduced into the second fluid bed reactor 121.

Although the above described the two-stage fluid bed reactor, namely the construction consisting of the first fluid bed reactor 111 and, continuously connected thereto, the second fluid bed reactor 121, use can also be made of a multistage fluid bed reactor consisting of a greater number of fluid bed reactors continuously connected to one another.

When a plurality of properties are imparted to the obtained polymer in the above multistage gas phase polymerization method, a feed gas mixture of desired composition is polymerized in an upstream fluid bed reactor, for example, the first fluid bed reactor 111, and the thus obtained polymer powder is taken up through the line 130 and fed into a downstream fluid fed reactor, for example, the second fluid bed reactor 121 so that the polymer powder is further polymerized.

In the second fluid bed reactor 121, the polymerization is generally performed with the use of a feed gas mixture of composition different from that of the upstream in the content of α-olefin gas and hydrogen gas.

However, this method has a drawback in that, while desired property can be imparted to the polymer in the first-stage polymerization reaction, desired property cannot be imparted to the upstream obtained polymer in the downstream performed polymerization reaction.

The inventors have conducted extensive and intensive investigations of the cause thereof. As a result, they have found that desired property can be imparted to the polymer in the downstream polymerization as well by reducing the amount of α-olefin and hydrogen gas (subcomponents)

introduced together with the polymer powder to thereby regulate the composition of downstream supplied feed gas mixture during the transfer of the polymer powder from the upstream fluid bed reactor into the downstream fluid bed reactor. The present invention has been completed on the basis of this finding.

OBJECT OF THE INVENTION

Under these circumstances, it is an object of the present invention to provide a method of multistage gas phase polymerization in which, when the polymer powder taken up from an upstream fluid bed reactor is carried while being entrained by a feed gas for a downstream fluid bed reactor so that the polymer powder is introduced into the downstream fluid bed reactor, hydrogen gas and comonomers which inhibit the polymerization reaction in the downstream fluid bed reactor and which render regulation of desired polymer properties difficult are removed from the polymer powder.

It is another object of the present invention to provide a device for removing subcomponents such as hydrogen gas and comonomers from the polymer powder taken up from an upstream fluid bed reactor before the introduction thereof into a downstream fluid bed reactor to thereby lower the subcomponent content of the polymer powder in a multistage gas phase polymerization apparatus. It is a further object of the present invention to provide an apparatus of multistage gas phase polymerization including this device.

SUMMARY OF THE INVENTION

The present invention has been made with a view toward solving the above problems of the prior art and attaining the above object. In one aspect of the present invention, there is provided a method of multistage gas phase polymerization, comprising performing polymerization of a feed gas mixture at least containing ethylene gas, an α-olefin gas and hydrogen gas in an upstream arranged fluid bed reactor to thereby obtain polymer powder, taking up the polymer powder therefrom and performing further polymerization of the polymer powder in a downstream arranged fluid bed reactor, the downstream arranged fluid bed reactor continuously connected to the upstream arranged fluid bed reactor so that the polymer powder taken up from the upstream arranged fluid bed reactor is introduced into the downstream arranged fluid bed reactor, which method comprises the steps of:
　taking up polymer powder from an upstream arranged fluid bed reactor,
　treating the taken up polymer powder so as to lower a content of α-olefin gas and hydrogen gas therein, and
　introducing the treated polymer powder into a downstream arranged fluid bed reactor.

The composition of feed gas mixture brought into actual reaction in each of the upstream and downstream arranged fluid bed reactors can be regulated in the above multistage gas phase polymerization wherein polymerization of a feed gas mixture at least containing ethylene gas, an α-olefin gas and hydrogen gas is performed in an upstream arranged fluid bed reactor to thereby obtain polymer powder, the polymer powder is taken up therefrom, the content of unreacted α-olefin gas and hydrogen gas in the polymer powder is lowered and the polymer powder is introduced into a downstream arranged fluid bed reactor. This enables changing properties imparted to the polymer in each of the upstream and downstream arranged fluid bed reactors in conformity with the use of the resultant polymer.

In the multistage gas phase polymerization method of the present invention, it is preferred that the above treating step be one in which a stream of given gas is introduced into the polymer powder taken up from the upstream arranged fluid bed reactor so that the α-olefin gas and hydrogen gas mixed in the polymer powder are removed.

The subcomponent content of the polymer powder can be effectively lowered by removing subcomponents such as the α-olefin gas and hydrogen gas mixed in the upstream obtained polymer before the transfer to the downstream fluid bed reactor.

In another aspect of the present invention, there is provided an apparatus for multistage gas phase polymerization, comprising:
　a plural-stage fluid bed reactor, in at least most upstream of which a solid catalyst for polymerization is fed into a fluid bed reactor, and in each of which a feed gas mixture is blown through a dispersion grid into the fluid bed reactor from a bottom of the fluid bed reactor, to thereby form a fluid bed in the fluid bed reactor, and a gas phase polymerization reaction is carried out in the fluid bed so that a polymer is produced;
　a carrying path branched from an introduction path for introducing a feed gas mixture into a downstream arranged fluid bed reactor and connected to an upper part of the downstream arranged fluid bed reactor; and
　a line connected at its one end to the carrying path and connected at its other end to an upstream arranged fluid bed reactor,
　wherein:
　　the feed gas mixture at least contains ethylene gas, an α-olefin gas and hydrogen gas; and
　　in the carrying path polymer powder produced in the upstream arranged fluid bed reactor is taken up and treated so as to lower a content of α-olefin gas and hydrogen gas (hereinafter also referred to as "subcomponents") in the taken up polymer powder, the treated polymer powder is introduced into the downstream arranged fluid bed reactor.

The composition of feed gas mixture brought into actual reaction in each of the upstream and downstream arranged fluid bed reactors can be regulated in the above multistage gas phase polymerization wherein polymerization of a feed gas mixture at least containing ethylene gas, an α-olefin gas and hydrogen gas is performed in an upstream arranged fluid bed reactor to thereby obtain polymer powder, the polymer powder is taken up therefrom, the content of unreacted α-olefin gas and hydrogen gas in the polymer powder is lowered and the polymer powder is introduced into a downstream arranged fluid bed reactor. This enables changing properties imparted to the polymer in each of the upstream and downstream arranged fluid bed reactors in conformity with the use of the resultant polymer.

In the multistage gas phase polymerization apparatus of the present invention, the above line is preferably fitted with separating means for removing the α-olefin gas and hydrogen gas mixed in the polymer powder from the polymer powder.

Further, it is preferred that the separating means comprise a residence tank for temporarily retaining the polymer powder, an introduction passage for introducing a stream of given gas into the residence tank and a discharge passage for discharging the subcomponents,
　so that the subcomponents mixed in the polymer powder retained in the residence tank are removed through the discharge passage by the use of the stream introduced through the introduction passage.

The subcomponents can be effectively separated from the polymer powder and removed through the discharge passage by arranging separating means comprising, for example, the residence tank, introduction passage and discharge passage, and temporarily retaining the upstream obtained polymer powder in the residence tank and introducing a stream of given gas into the residence tank through the introduction passage to thereby carry out purging. This enables effectively lowering the subcomponent content of the downstream fed polymer powder.

In a further aspect of the present invention, there is provided a device for reducing entrainment of subcomponents by downstream introduced polymer powder in an apparatus for multistage gas phase polymerization, the apparatus comprising:

a plural-stage fluid bed reactor, in at least most upstream of which a solid catalyst for polymerization is fed into a fluid bed reactor, and in each of which a feed gas mixture at least containing ethylene gas, an α-olefin gas and hydrogen gas is blown through a dispersion grid into the fluid bed reactor from a bottom of the fluid bed reactor, to thereby form a fluid bed in the fluid bed reactor, and a gas phase polymerization reaction is carried out in the fluid bed so that a polymer is produced;

a carrying path branched from an introduction path for introducing a feed gas mixture into a downstream arranged fluid bed reactor and connected to an upper part of the downstream arranged fluid bed reactor; and a line connected at its one end to the carrying path and connected at its other end to an upstream arranged fluid bed reactor, the downstream arranged fluid bed reactor being continuously connected to the upstream arranged fluid bed reactor so that the polymer powder produced in the upstream arranged fluid bed reactor is taken up through the line and introduced into the downstream arranged fluid bed reactor, which device comprises a residence tank for temporarily retaining the polymer powder, an introduction passage for introducing a stream of given gas into the residence tank and a discharge passage for discharging subcomponents, so that α-olefin gas and hydrogen gas (subcomponents) mixed in the polymer powder retained in the residence tank are removed through the discharge passage by the use of the stream introduced through the introduction passage.

The subcomponents can be effectively separated from the polymer powder and removed through the discharge passage by, in the multistage gas phase polymerization apparatus, temporarily retaining the upstream obtained polymer powder in the residence tank and introducing a stream of given gas into the residence tank through the introduction passage to thereby carry out purging. This enables effectively lowering the subcomponent content of the downstream fed polymer powder.

EMBODIMENT OF THE INVENTION

The method of multistage gas phase polymerization, apparatus for multistage gas phase polymerization and device for reducing entrainment of subcomponents by polymer powder in a multistage gas phase polymerization apparatus according to the present invention will be described below with reference to the appended drawings.

Figure 1:
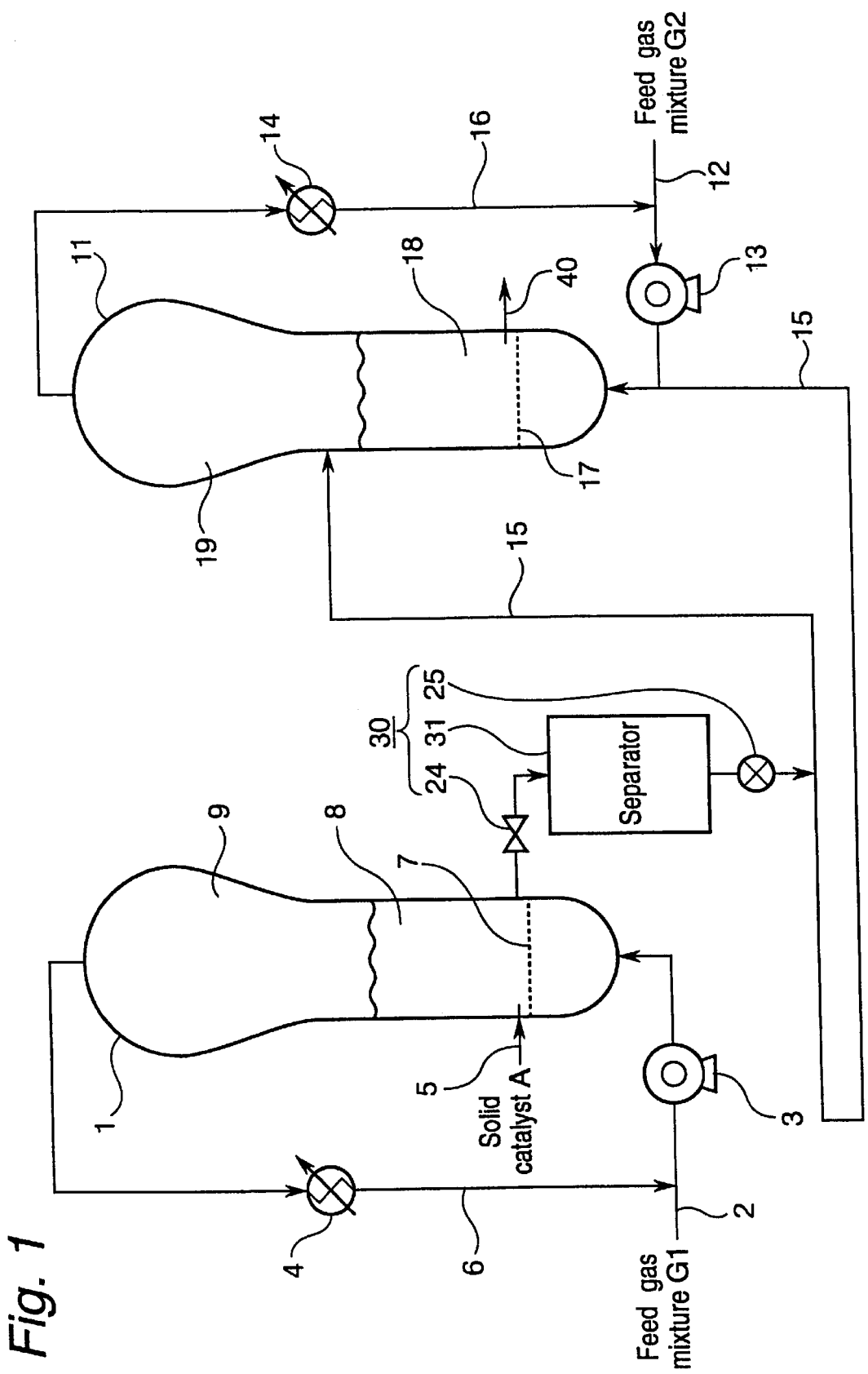
FIG. 1 is a schematic view of an embodiment of multistage gas phase polymerization apparatus according to the present invention.

FIG. 1 is a schematic view of an embodiment of multistage gas phase polymerization apparatus according to the present invention.

Referring to FIG. 1, this multistage gas phase polymerization apparatus comprises first fluid bed reactor 1 for performing a polymerization reaction of a feed gas mixture at least containing ethylene and an α-olefin in the presence of a solid catalyst such as a metallocene catalyst or a titanium catalyst to thereby obtain ethylene/α-olefin copolymer powder (hereinafter simply referred to as "polymer powder") and second fluid bed reactor 11, connected to the first fluid bed reactor 1, for performing a polymerization reaction of polymer powder taken up from the first fluid bed reactor 1 through product take-up line 30, solid catalyst entrained by the polymer powder and newly fed feed gas mixture.

The above feed gas mixture is a gas mixture at least containing ethylene, an α-olefin and hydrogen (hereinafter, components other than ethylene may also be collectively referred to as "subcomponents"). The feed gas mixture G1 charged into the first fluid bed reactor 1 differs from the feed gas mixture G2 charged into the second fluid bed reactor 11 in the mixing ratios of gases. The α-olefin generally has 3 to 20 carbon atoms, preferably 4 to 13 carbon atoms, and still preferably 4 to 12 carbon atoms. Specifically, the α-olefin can be, for example, butene, hexene or 4-methyl-1-pentene.

In specific modes, when, for example, a metallocene is used as the catalyst and hexene used as the monomer, the mixing ratio of α-olefin is about 10 mol %, preferably 3 to 8 mol %, with respect to the feed gas mixture G1 and is about 5 mol %, preferably 1 to 3 mol %, with respect to the feed gas mixture G2.

Alternatively, the mixing ratios of α-olefin are exchanged between the feed gas mixture G1 and G2. That is, with respect to the feed gas mixture G1 the mixing ratio of α-olefin is about 5 mol %, preferably 1 to 3 mol % and with respect to the feed gas mixture G2 the mixing ratio of α-olefin is about 10 mol %, preferably 3 to 8 mol %.

Each of the feed gas mixtures may be mixed with an inert gas such as nitrogen or a saturated hydrocarbon, e.g., isopentane. The mixing of the inert gas in the feed gas mixture facilitates the removal of heat generated during polymerization.

The first fluid bed reactor 1 has the following construction. Solid catalyst A for polymerization is fed through catalyst supply line 5 into the first fluid bed reactor 1. Simultaneously, the feed gas mixture G1 is blown through feed supply line 2 into the first fluid bed reactor 1 at its bottom with the use of blower 3, so that the feed gas mixture G1 is brought above dispersion grid 7. Above the dispersion grid 7, fluid bed 8 is formed by the charged feed gas mixture G1 and the solid catalyst A. The first-stage gas phase polymerization reaction is carried out in the fluid bed 8 while maintaining the fluid bed (reaction system) 8 in fluid form, thereby producing copolymer particles or powder.

On the other hand, unreacted feed gas mixture having passed through the fluid bed 8 has its flow rate reduced in slowdown zone 9 provided in an upper part of the first fluid bed reactor 1 and discharged through a gas outlet provided at the top of the first fluid bed reactor 1 outside the first fluid bed reactor 1.

The feed gas mixture having been discharged from the first fluid bed reactor 1 is passed through circulating line 6, joins the feed supply line 2 and is once more fed into the fluid bed 8. Because heat of polymerization reaction must be removed before once more feeding the feed gas mixture into the fluid bed 8, heat exchanger 4 is provided on the circulating line 6 to thereby enable passing the feed gas mixture through the heat exchanger 4 to be cooled before the joining thereof with the feed supply line 2.

On the other hand, the second fluid bed reactor 11 has the following construction. In the same fashion as in the first fluid bed reactor 1, feed gas mixture G2 having a mixing ratio different from that of the feed gas mixture G1 is blown through feed supply line 12 into the second fluid bed reactor 11 at its bottom with the use of blower 13, so that the feed gas mixture G2 is brought above dispersion grid 17. Above the dispersion grid 17, fluid bed 19 is formed by the charged feed gas mixture G2, polymer powder introduced through carrying line 15 and solid catalyst for polymerization entrained by the polymer powder. Further gas phase polymerization reaction is carried out in the fluid bed 18 while maintaining the fluid bed 18 in fluid form, thereby producing a copolymer.

The carrying line 15 is branched from the supply line 12 at its side of blower 13 outlet and connected at its middle to the outlet side of powder take-up line 30. End of the carrying line 15 is connected to an upper part, for example, a gas zone in upper part of the fluid bed of the second fluid bed reactor 11.

On the other hand, unreacted feed gas mixture having passed through the fluid bed 18 has its flow rate reduced in slowdown zone 19 provided in an upper part of the second fluid bed reactor 11 and discharged through a gas outlet provided at the top of the second fluid bed reactor 11 outside the second fluid bed reactor 11. Because the discharged feed gas mixture must be rid of heat of polymerization reaction before being once more fed into the fluid bed 18, heat exchanger 14 is provided on circulating line 16 to thereby enable passing the feed gas mixture through the heat exchanger 14 to be cooled. The cooled feed gas mixture joins the feed supply line 12.

The copolymer produced by the advance of polymerization reaction in the fluid bed 18 is taken up through product take-up line 40. Solid catalyst may be fed in the second fluid bed reactor 11 as well.

Polymer powder formed by the advance of polymerization reaction in the fluid bed 8 is fed to the product take-up line 30. One end of the product take-up line 30 is connected to the first fluid bed reactor 1, and the other end thereof is connected to the carrying line 15. There, main valve 24, separator 31 and valve 25 are arranged in this sequence from the side of first fluid bed reactor 1.

The polymer powder fed from the first fluid bed reactor 1 to the product take-up line 30 is rid of subcomponents such as α-olefins (comonomers) and hydrogen gas mixed in the polymer powder by means of the separator 31. The main valve 24 is such a weight valve that, when a given amount of polymer powder is produced by the first fluid bed reactor 1, the polymer powder is fed to the separator 31. On the other hand, the valve 25 is so designed that, by means of, for example, the action of a rotary valve, only powder component obtained by the separator 31 is delivered at a constant rate into the carrying line 15. This powder portion of the polymer is entrained by a flow of, as carrying medium, the feed gas from the blower 13 into the second fluid bed reactor 11.

Figure 2:
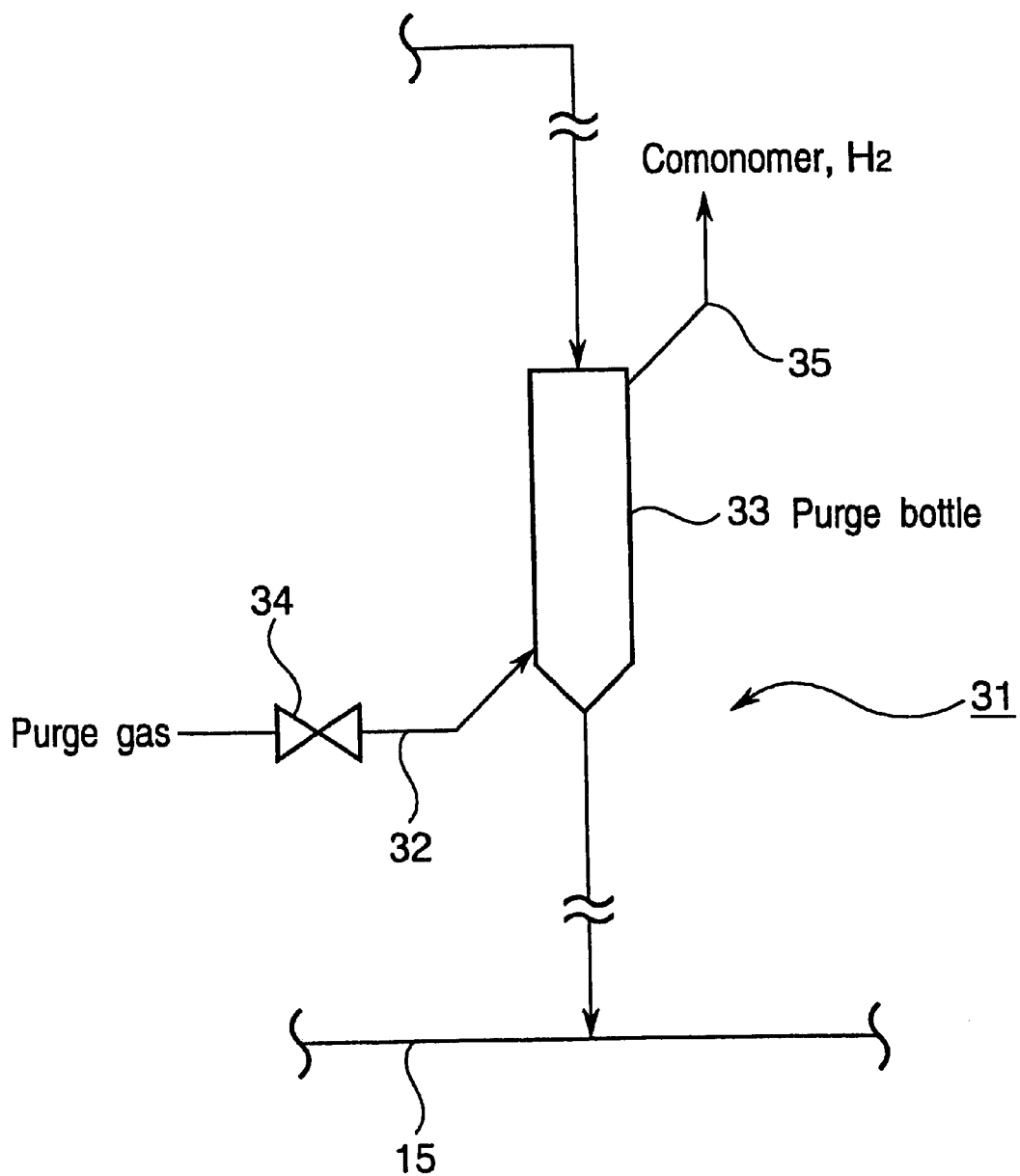
FIG. 2 is a schematic view of an embodiment of device of the present invention for reducing entrainment of subcomponents by polymer powder in a multistage gas phase polymerization apparatus.
Figure 3:
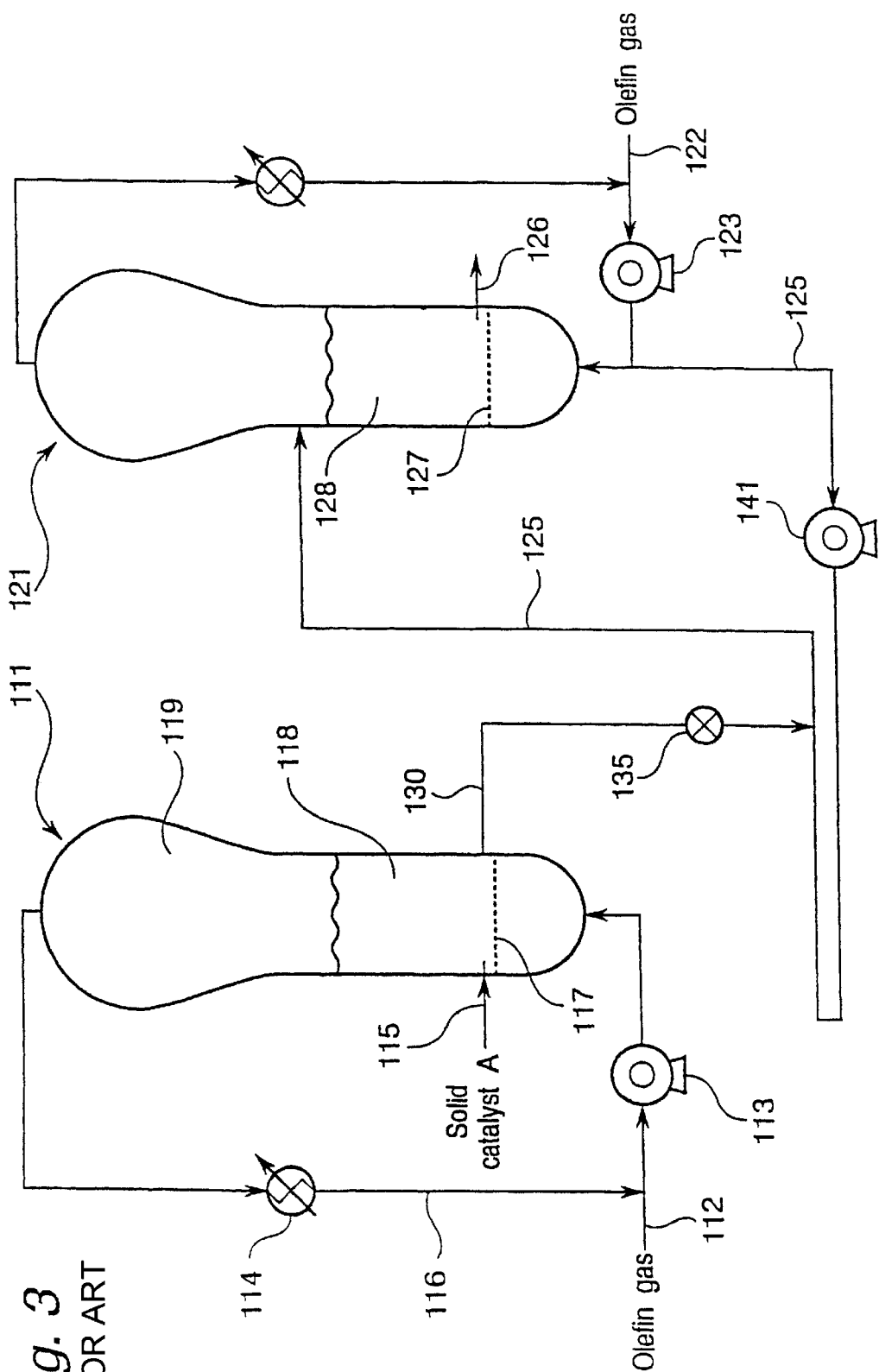
FIG. 3 is a schematic view of the multistage gas phase polymerization apparatus of the prior art.

The separator 31 has the following construction. Referring to FIG. 2, for example, the separator 31 comprises purge bottle 33 as a residence tank for temporarily retaining polymer powder fed through the main valve 24 and purge gas supply line 32 as an introduction passage for introducing a stream of given gas, namely purge gas, into the purge bottle 33. Subcomponents mixed in the polymer powder retained in the purge bottle 33 are separated with the use of the purge bas introduced through purge gas valve 34 from the purge gas supply line 32 and removed through purge gas discharge line 35 as a discharge passage.

In the separator 31, the polymer powder produced by the first fluid bed reactor 1 is once retained in the purge bottle 33. Simultaneously, the purge gas valve 34 is opened to thereby introduce purge gas from the purge gas supply line 32 into the purge bottle 33, so that the purge gas collides with the polymer powder. As a result, subcomponents are separated from the polymer powder, and separated subcomponents are entrained by a stream of purge gas through the purge gas discharge line 35 to thereby effect removal thereof.

This purge gas may consist of, for example, ethylene or the aforementioned inert gas. The purged comonomer (α-olefin) and hydrogen gas, for example, may be caused to pass through a line (not shown) joining the circulating line 6 and once more fed into the fluid bed 8, or may be directly returned to the first fluid bed reactor 1, or may be separately recovered and subjected to other uses.

As apparent from the above, in the present invention, the polymer powder produced by the first fluid bed reactor 1 is taken up, and α-olefin gas and hydrogen gas mixed in the polymer powder are removed from the polymer powder by the separator 31 as appropriate means for treating the polymer powder so that the content of α-olefin gas and hydrogen gas in the taken up polymer powder is lowered. Thereafter, the treated polymer powder is introduced in the second fluid bed reactor 11.

As a result, hydrogen gas and α-olefin gas remaining unreacted in the polymerization reaction of the first fluid bed reactor 1 are effectively removed before the introduction into the second fluid bed reactor 11, so that any adverse effect of the unreacted subcomponents of the first fluid bed reactor 1 on the polymerization reaction within the second fluid bed reactor 11 can be avoided.

Therefore, for example, when the content of subcomponents (α-olefin gas and hydrogen gas) in the feed gas mixture is lower in the downstream fluid bed reactor than in the upstream fluid bed reactor, polymerization for forming a polymer of relatively small molecular weight and high α-olefin content can be effected in the upstream fluid bed reactor, while polymerization for forming a polymer of larger molecular weight and lower α-olefin content than in upstream polymerization can be effected in the downstream fluid bed reactor.

Further, when the content of subcomponents in the feed gas mixture is higher in the downstream fluid bed reactor than in the upstream fluid bed reactor, polymerization for forming a polymer of relatively large molecular weight and small α-olefin content can be effected in the upstream fluid bed reactor, while polymerization for forming a polymer of smaller molecular weight and higher α-olefin content than in upstream polymerization can be effected in the downstream fluid bed reactor.

Accordingly, desired property can be easily imparted to the polymer powder at each stage of polymerization reaction only by changing the component ratio of the feed gas mixture supplied at the particular stage of polymerization reaction. Therefore, it becomes feasible to produce polymers conforming to diversifying market demands.

Although the two-stage polymerization method has been described in the above embodiment, the present invention is naturally applicable to a three or more-stage gas phase polymerization.

Further, although an embodiment fitting a one-stage separator has been described above, the purge bottle may be fixed to a higher, for example, two or three-stage separator in order to render the separation of subcomponents more secure.

While there has been described a preferred embodiment of the present invention, it is to be understood that the present invention is in no way limited thereto and various modifications can be made without departing from the object of the present invention.

EFFECT OF THE INVENTION

The method of multistage gas phase polymerization according to the present invention enables regulating the composition of feed gas mixture actually reacted in each stage of fluid bed reactor. Thus, it becomes feasible to change property imparted to polymer at each stage of fluid bed reactor in conformity with the use of obtained polymer.

The subcomponent content of polymer powder can be effectively lowered by separating off subcomponents such as α-olefin gas and hydrogen gas mixed in upstream produced polymer with the use of a stream of given gas before the feeding into a downstream fluid bed reactor, so that suppressing the introduction of subcomponents into the downstream fluid bed reactor can be facilitated. Therefore, controlling the polymerization reaction at each stage of fluid bed reactor can be facilitated, and the property imparted to polymer at each stage of fluid bed reactor can be effectively changed.

The apparatus for multistage gas phase polymerization according to the present invention enables regulating the composition of feed gas mixture actually reacted in each stage of fluid bed reactor. Thus, it becomes feasible to change property imparted to polymer at each stage of fluid bed reactor in conformity with the use of obtained polymer.

Subcomponents can be effectively separated from polymer powder and removed through discharge passage by arranging separating means fitted with, for example, a residence tank, an introduction passage and a discharge passage and by temporarily retaining upstream obtained polymer powder in the residence tank and introducing through the introduction passage a stream of given gas thereinto for purging. Therefore, the subcomponent content of downstream fed polymer powder can be effectively lowered, so that the downstream polymerization reaction can be effectively controlled. Accordingly, the property imparted to polymer at each stage of fluid bed reactor can be effectively changed.

In the application of the device for reducing entrainment of subcomponents in polymer powder in a multistage gas phase polymerization apparatus according to the present invention, subcomponents can be effectively separated from polymer powder and removed through discharge passage by temporarily retaining polymer powder upstream produced in a multistage gas phase polymerization apparatus in a residence tank and introducing through an introduction passage a stream of given gas thereinto for purging. Therefore, the subcomponent content of downstream fed polymer powder can be effectively lowered.

What is claimed is:

1. A method of multistage gas phase polymerization, comprising performing polymerization of a feed gas mixture at least containing ethylene gas, an α-olefin gas and hydrogen gas in an upstream fluid bed reactor to thereby produce a polymer powder, recovering the thus-produced polymer powder and performing further polymerization of the polymer powder in a downstream fluid bed reactor, the downstream fluid bed reactor being continuously connected to the upstream fluid bed reactor so that the polymer powder recovered from the upstream fluid bed reactor is introduced into the downstream fluid bed reactor, which method comprises the steps of:
  recovering polymer powder from said upstream fluid bed reactor,
  treating the recovered polymer powder so as to lower the content of α-olefin gas and hydrogen gas therein by contacting said polymer powder with a gas comprising ethylene or an inert gas, and
  introducing the treated polymer powder into said downstream fluid bed reactor.

2. The method as claimed in claim 1, wherein said gas is ethylene.

3. The method as claimed in claim 1, wherein said inert gas is nitrogen or a saturated hydrocarbon.

* * * * *